(12) United States Patent
Yuza

(10) Patent No.: US 11,110,669 B2
(45) Date of Patent: Sep. 7, 2021

(54) FORMED ARTICLE OF FIBER-REINFORCED RESIN MATERIAL, AND METHOD AND DIE APPARATUS FOR PRODUCING THE SAME

(71) Applicant: HONDA MOTOR CO., LTD., Tokyo (JP)

(72) Inventor: Yoshihide Yuza, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 193 days.

(21) Appl. No.: 16/140,618

(22) Filed: Sep. 25, 2018

(65) Prior Publication Data

US 2019/0091949 A1 Mar. 28, 2019

(30) Foreign Application Priority Data

Sep. 27, 2017 (JP) .............................. JP2017-186133

(51) Int. Cl.
*B29C 43/52* (2006.01)
*B29C 70/46* (2006.01)
(Continued)

(52) U.S. Cl.
CPC ............ *B29C 70/465* (2013.01); *B29C 35/02* (2013.01); *B29C 43/203* (2013.01); *B29C 43/36* (2013.01);
(Continued)

(58) Field of Classification Search
CPC ......... B29C 43/18; B29C 43/52; B29C 35/02; B29C 70/46; B29C 70/54; B29C 70/528;
(Continued)

(56) References Cited

U.S. PATENT DOCUMENTS

2008/0303194 A1 12/2008 Anbarasu et al.
2012/0219660 A1* 8/2012 Sana ........................ B29C 43/18
425/470

(Continued)

FOREIGN PATENT DOCUMENTS

EP 0404420 A1 * 12/1990 ............. B21D 51/26
JP 02-092756 4/1990
(Continued)

OTHER PUBLICATIONS

Extended European Search Report for European Patent Application No. 18197337.1 dated Feb. 5, 2019.
(Continued)

*Primary Examiner* — Joseph S Del Sole
*Assistant Examiner* — Margaret B Hayes
(74) *Attorney, Agent, or Firm* — Amin, Turocy & Watson, LLP

(57) ABSTRACT

A formed article of a fiber-reinforced resin material is provided. The fiber-reinforced resin material is obtained by impregnating a plurality of stacked fiber layers with a resin. The formed article contains a first portion and a second portion formed to have a deep-drawn shape with respect to the first portion. The second portion contains a gradually changing portion with its thickness gradually changing, and the thickness of the gradually changing portion decreases with distance from the first portion.

7 Claims, 11 Drawing Sheets

(51) Int. Cl.
  *B29C 43/20* (2006.01)
  *B29C 43/36* (2006.01)
  *B29C 70/54* (2006.01)
  *B29C 35/02* (2006.01)
  *B29L 9/00* (2006.01)
  *B29K 69/00* (2006.01)
  *B29K 307/04* (2006.01)
  *B29K 105/08* (2006.01)
  *B29K 101/12* (2006.01)

(52) U.S. Cl.
  CPC ............ *B29C 43/361* (2013.01); *B29C 43/52* (2013.01); *B29C 70/46* (2013.01); *B29C 70/54* (2013.01); *B29C 2043/3634* (2013.01); *B29K 2069/00* (2013.01); *B29K 2101/12* (2013.01); *B29K 2105/0809* (2013.01); *B29K 2105/0845* (2013.01); *B29K 2307/04* (2013.01); *B29L 2009/00* (2013.01)

(58) Field of Classification Search
  CPC ....... B29C 70/12; B29C 43/203; B29C 43/36; B29C 43/361; B21D 51/26; B32B 3/28; Y10T 428/24479; Y10T 428/24488
  See application file for complete search history.

(56) References Cited

U.S. PATENT DOCUMENTS

| | | | |
|---|---|---|---|
| 2013/0134621 A1* | 5/2013 | Tsotsis | B29C 70/528 264/177.2 |
| 2014/0004308 A1* | 1/2014 | Taniguchi | B29C 43/18 428/156 |
| 2016/0158975 A1* | 6/2016 | Suzuki | B29C 70/12 428/174 |
| 2016/0368540 A1 | 12/2016 | Terada | |
| 2017/0015024 A1* | 1/2017 | Suzuki | B29C 43/36 |

FOREIGN PATENT DOCUMENTS

| | | |
|---|---|---|
| JP | 06-106555 | 4/1994 |
| JP | 10-249076 | 9/1998 |
| JP | 2009196145 A * | 9/2009 |
| JP | 6084069 | 9/2014 |
| JP | 2015-013392 | 1/2015 |
| WO | 2006/008529 | 1/2006 |
| WO | 2013/016482 | 1/2013 |

OTHER PUBLICATIONS

Japanese Office Action for Japanese Patent Application No. 2017-186133 dated Aug. 18, 2020.

\* cited by examiner

FORMED ARTICLE OF FIBER-REINFORCED RESIN MATERIAL, AND METHOD AND DIE APPARATUS FOR PRODUCING THE SAME

CROSS-REFERENCE TO RELATED APPLICATION

This application is based upon and claims the benefit of priority from Japanese Patent Application No. 2017-186133 filed on Sep. 27, 2017, the contents of which are incorporated herein by reference.

BACKGROUND OF THE INVENTION

Field of the Invention

The present invention relates to a formed article of a fiber-reinforced resin material containing a stack of fiber layers impregnated with a resin, and further relates to a method and a die apparatus for producing the formed article.

Description of the Related Art

A method for producing a formed article of a fiber-reinforced resin material, which contains press-forming a stack of cloth fiber layers and thin thermoplastic resin layers in a heated die, has been well known (see, for example, Japanese Patent No. 6084069 relating to a direct stacking method). This method does not require preparation of a prepreg, and thus the method is advantageous in that the formed article can be efficiently produced in a short time.

SUMMARY OF THE INVENTION

In a case where the fiber-reinforced resin material is deep-drawn in a press forming process using a die, the fiber layer is often ruptured in the vicinity of a bent portion, and a part of the fiber layer is often exposed due to loss of the resin layer. Thus, in this case, the resultant formed article may have a deteriorated appearance, and may fail to exhibit satisfactory strength as the fiber resin composite material, disadvantageously. Therefore, the inventor has analyzed the cause for the disadvantage as follows.

FIG. 10 is a vertical cross-sectional view of a principal part of a die apparatus 70. The die apparatus 70 contains a first shaping die 74 having a first convex portion 72 and a second shaping die 78 having a second convex portion 76. In the die apparatus 70, a plurality of fiber layers FL are impregnated with resin Re, and a fiber-reinforced resin material P is formed. FIG. 10 illustrates a process of changing the die apparatus 70 into the closed state. A cavity 80 is formed between the first shaping die 74 and the second shaping die 78 in the closed state. The first shaping die 74 and the second shaping die 78 are heated to a temperature equal to or higher than the melting point of the resin Re before the closing process.

Starting materials for the fiber-reinforced resin material are placed in the die apparatus 70, and immediately thereafter, the second shaping die 78 is lowered toward the first shaping die 74. When the second shaping die 78 is brought into contact with the resin Re, the contact portion of the resin Re starts to be melted. The materials are placed in flat shapes extending in a substantially horizontal direction, and the second shaping die 78 is in an approximately surface contact with the materials in the lowering process. Therefore, the fiber layers FL are easily impregnated with the resin Re, and the resultant fiber-reinforced resin material is formed into a shape corresponding to the cavity 80.

In a portion to be formed into a deep-drawn shape having an inclined angle of approximately 50° to 90°, before the fiber layers FL are sufficiently impregnated with the resin Re, the clearance between the first shaping die 74 and the second shaping die 78 is made smaller than the total thickness of the starting materials of the resin Re and the fiber layers FL. Therefore, the second convex portion 76 in the second shaping die 78 is brought first into contact with the resin Re. The inventor has found that, in production of a formed article of a fiber-reinforced resin material having a deep-drawn shape with a large depth, the second convex portion 76 penetrates through the outermost resin Re layer as shown in FIGS. 10 and 11, whereby a part of the fiber layer FL is exposed and deteriorates the design property.

A principal object of the present invention is to provide a formed article of a fiber-reinforced resin material having satisfactory strength for use as a composite material.

Another object of the present invention is to provide a method for producing a formed article of a fiber-reinforced resin material, capable of improving a design property of an outer surface of a side wall portion having a deep-drawn portion in a direct stacking method.

A further object of the present invention is to provide a die apparatus for producing a formed article of a fiber-reinforced resin material.

According to an aspect of the present invention, there is provided a formed article (10, 81) of a fiber-reinforced resin material (P) comprising a plurality of stacked fiber layers (FL) and a resin (Re), the stacked fiber layers (FL) being impregnated with the resin (Re), the formed article (10, 81) comprising a first portion (22, 24, 86) and a second portion (26, 28, 84) formed to have a deep-drawn shape with respect to the first portion (22, 24, 86), wherein the second portion (26, 28, 84) contains a gradually changing portion (32, 94) with its thickness gradually changing, and the thickness of the gradually changing portion (32, 94) decreases with distance from the first portion (22, 24, 86).

According to another aspect of the present invention, there is provided a method for producing a formed article (10, 81) of a fiber-reinforced resin material (P), the method comprising a step of forming the article (10, 81) in a cavity (56) formed between a first shaping die (52) and a second shaping die (54) of a die apparatus (50), the fiber-reinforced resin material (P) containing a plurality of stacked fiber layers (FL) and a resin (Re), the stacked fiber layers (FL) being impregnated with the resin (Re), the formed article (10, 81) containing a first portion (22, 24, 86) and a second portion (26, 28, 84) bending from the first portion (22, 24, 86), wherein the first shaping die (52) or the second shaping die (54) includes a gradually changing portion-forming region (68) configured to form a gradually changing portion (32, 94) on at least part of a design surface (12) or a back surface (14) of the second portion (26, 28, 84).

According to a further aspect of the present invention, there is provided a die apparatus (50) for producing a formed article (10, 81) of a fiber-reinforced resin material (P), the apparatus comprising a first shaping die (52) and a second shaping die (54), the fiber-reinforced resin material (P) containing a plurality of stacked fiber layers (FL) and a resin (Re), the stacked fiber layers (FL) being impregnated with the resin (Re), the formed article (10, 81) containing a first portion (22, 24, 86) and a second portion (26, 28, 84) formed to have a deep-drawn shape with respect to the first portion (22, 24, 86), the formed article (10, 81) being press-formed in a cavity (56) formed between the first shaping die (52) and the second shaping die (54), wherein the first shaping die (52) or the second shaping die (54) includes a gradually changing portion-forming region (68) configured to form a gradually changing portion (32, 94) on at least part of a design surface (12) or a back surface (14) of the second portion (26, 28, 84).

As described above, in the present invention, the second portion has a gradually changing portion having a small thickness. Therefore, in the cavity, the width in the thickness direction of the gradually changing portion-forming region for forming the gradually changing portion is gradually reduced. As a result, the flow resistance of the resin is increased, and the impregnation of the fiber layers with the resin is promoted. Consequently, resin loss and fiber rupture can be prevented, so that the resultant formed article (10, 81) of the fiber-reinforced resin material can produce an excellent appearance (excellent design) and can exhibit satisfactory strength as a composite material.

In the present invention, the gradually changing portion (32, 94) may be located on a back surface (14) of a design surface (12) of the formed article (10, 81). In this case, when the gradually changing portion is located on the back of the design surface, the flexibility in the appearance design of the design surface is not reduced.

In the present invention, the second portion (26, 28, 84) may contain a thickened portion (38) on another side from the first portion (22, 24, 86). The thickened portion (38) is thicker than a thinnest portion in the gradually changing portion (32, 94) of the second portion (26, 28, 84). In this case, air bubbles generated in the second portion can be easily collected in a thickened portion-forming region for forming the thickened portion. Therefore, air bubbles in the gradually changing portion in the second portion can be easily removed, so that the design surface can be obtained with excellent appearance. In addition, the thickened portion can be removed to form a notch or the like.

In the present invention, the formed article (10, 81) may further comprise a third portion (34, 82) bending from the second portion (26, 28, 84) in a direction away from the first portion (22, 24, 86), and the second portion (26, 28, 84) may be thicker than the first portion (22, 24, 86). In this case, the second portion can achieve improved rigidity in an opening direction, and thus the formed article can be suitably applied in a case where the third portion is subjected to an external load.

In the present invention, in the forming step, one of the first shaping die (52) and the second shaping die (54) configured to form the gradually changing portion (32, 94) may be configured to have a temperature equal to or higher than a glass-transition temperature of the resin (Re) and lower than a melting point of the resin (Re), and another of the first shaping die (52) and the second shaping die (54) may be configured to have a temperature equal to or higher than the melting point of the resin (Re).

In the present invention, the first shaping die (52) and the second shaping die (54) may include a heating unit (57) configured to heat the dies, and one of the first shaping die (52) and the second shaping die (54) including the gradually changing portion-forming region (68) configured to form the gradually changing portion (32, 94) of the formed article (10, 81) is configured to be heated by the heating unit (57) at a temperature equal to or higher than the glass-transition temperature of the resin (Re) and lower than the melting point of the resin (Re).

In this case, the shaping die having the lower temperature does not act to melt the resin, and slides on the outer surface of the resin. Therefore, the fiber rupture by the shaping die can be prevented. Furthermore, the surface of the resin can be smoothened by the sliding. Therefore, even in a case where the deep-drawing press forming is performed to prepare a high wall as the second portion on the first portion, the resultant formed article can be obtained with excellent appearance. In addition, when the shaping die having the lower temperature slides on the surface of the resin, the resin is pressed against and brought into contact with the other shaping die having the higher temperature. As a result, the resin is melted and the fiber layers are impregnated with the melted resin. Consequently, the resultant formed article can achieve excellent strength as a composite material.

In the present invention, the second portion may be contiguous with and bend from the first portion, and the second portion may contain the gradually changing portion with a thinned portion. The die apparatus for producing the formed article may have a gradually changing portion-forming region for forming the gradually changing portion in a cavity. The thickness-direction width of the gradually changing portion-forming region is gradually reduced. In a thinned portion of the gradually changing portion-forming region, the flow resistance of the resin is increased, and the impregnation of the fiber layers with the resin is promoted.

Consequently, the resin loss and the fiber rupture can be prevented, so that the resultant formed article can produce an excellent appearance (excellent design) and can exhibit satisfactory strength as a composite material.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Several preferred embodiments of a formed article of a fiber-reinforced resin material and a method for producing the same according to the present invention will be described in detail below with reference to the accompanying drawings. Hereinafter, a formed article of the fiber-reinforced resin material may also be referred to simply as a resin formed article.

Figure 1:
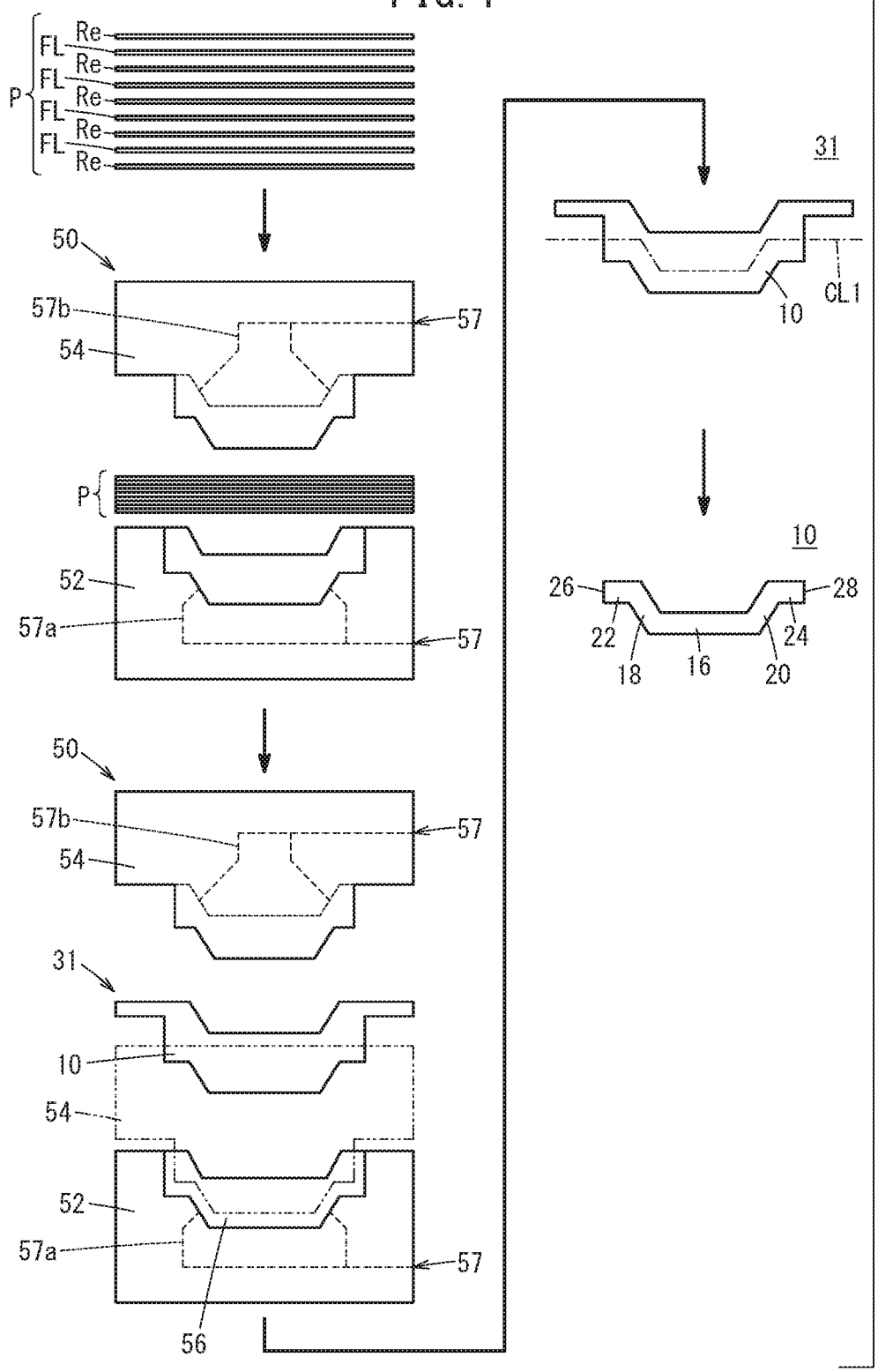
FIG. 1 is a schematic view for illustrating a process flow for producing a resin formed article (a cover member) from a cloth fiber layers and a resin using a press forming die apparatus.
Figure 2:
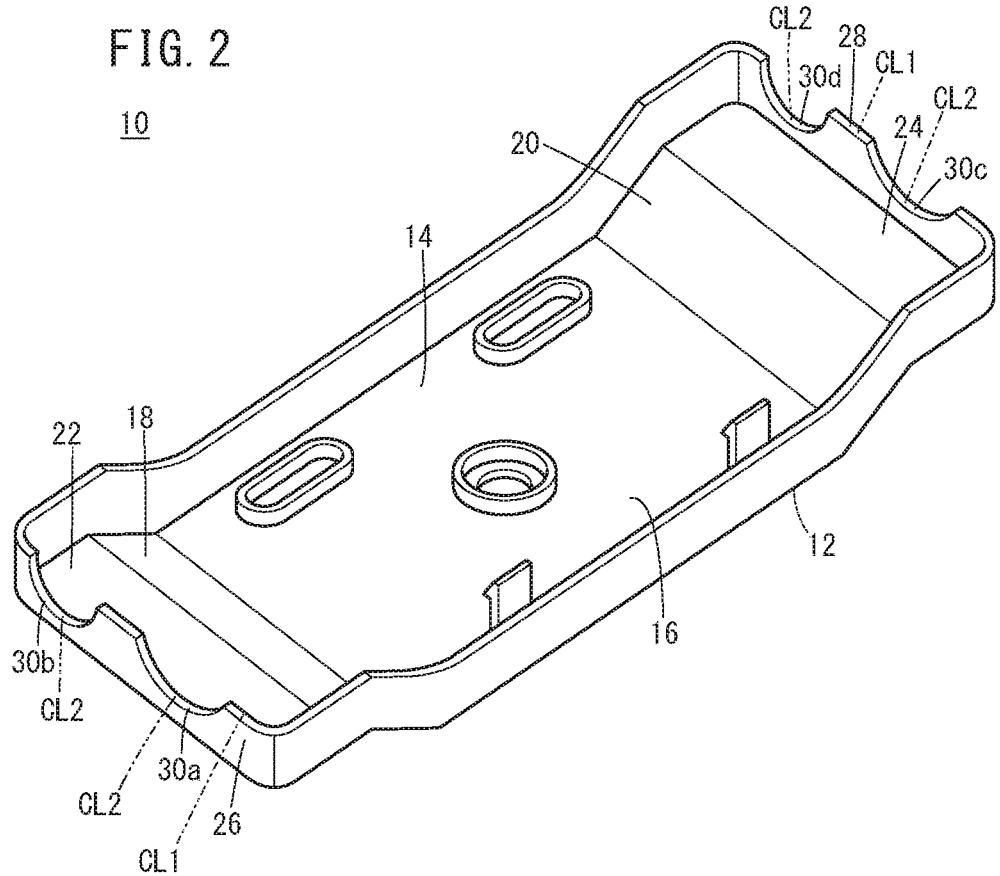
FIG. 2 is a schematic perspective bottom view of the cover member of the formed article of a fiber-reinforced resin material (a resin formed article)

FIG. 1 is a schematic view for illustrating a process flow for producing a cover member 10 as an example of the resin formed article. The cover member 10 is produced from cloth fiber layers FL and layers of a resin Re by using a press forming die apparatus 50. The cover member 10 is used for protecting an electrical component in a motorcycle. The details of the cover member 10 are shown in FIG. 2. The surface shown in FIG. 2 is a rear surface (a back surface 14) of a design surface 12 (an outer surface) that is recognized visually by a user. For example, the fiber layer FL may be a woven cloth of a carbon fiber, and the resin Re may be a high-transparent, high-rigid polycarbonate.

The cover member 10 will be described in detail below. The cover member 10 is produced by the press forming die apparatus 50, and has a bottom portion 16, a first inclined portion 18 and a second inclined portion 20, a first horizontal portion 22 and a second horizontal portion 24 (first portions), and a first wall portion 26 and a second wall portion 28 (second portions). The bottom portion 16 extends in the horizontal direction. The first inclined portion 18 and the second inclined portion 20 each extend from an end of the bottom portion 16, and are inclined relative to the horizontal direction. The first horizontal portion 22 and the second horizontal portion 24 each extend in the horizontal direction from an end of the first inclined portion 18 and the second inclined portion 20. The first wall portion 26 and the second wall portion 28 are each a part of a peripheral wall. The peripheral wall is formed by deep drawing in the outer edge to rise substantially vertically. A first notch 30a and a second notch 30b having a substantially semicircular shape are formed in the first wall portion 26 rising from the first horizontal portion 22. Similarly, a third notch 30c and a fourth notch 30d having a substantially semicircular shape are formed in the second wall portion 28 rising from the second horizontal portion 24.

Figure 3:
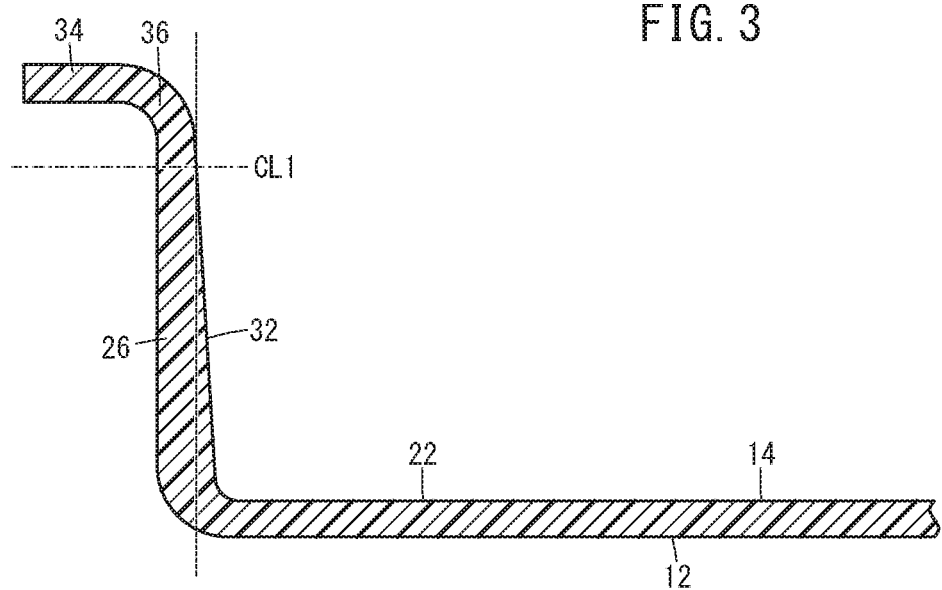
FIG. 3 is an enlarged vertical cross-sectional view of a principal part of an intermediate product for producing the cover member shown in FIG. 1.
Figure 4:
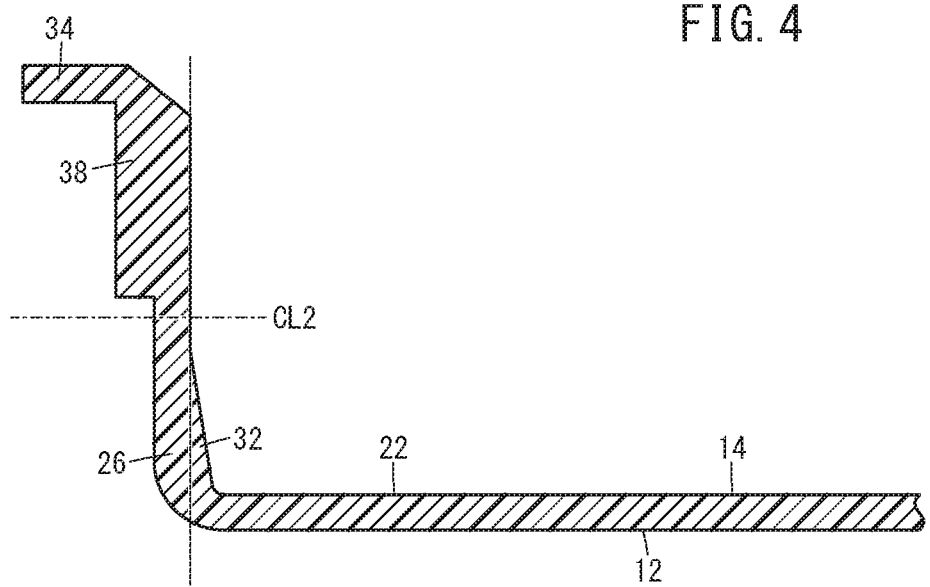
FIG. 4 is an enlarged vertical cross-sectional view of another principal part of the intermediate product shown in FIG. 3.

FIGS. 3 and 4 are each an enlarged vertical cross-sectional view of a principal part of an intermediate product 31 containing the first horizontal portion 22 and the first wall portion 26. The cover member 10 is obtained by cutting and removing portions to be cut off from the intermediate product 31. FIG. 3 is a vertical cross-sectional view of a portion not having the first notch 30a or the second notch 30b, and FIG. 4 is a vertical cross-sectional view of a portion having the second notch 30b. The intermediate product 31 is cut along cut lines CL1 and CL2 shown in FIGS. 3 and 4 to produce the cover member 10. The cut line CL2 corresponds to the deepest portion of the second notch 30b.

As shown in FIGS. 3 and 4, the outer surface of the first wall portion 26 is formed as a substantially vertical surface, whereas the back surface 14 thereof is formed as a gradually changing portion 32 in its entirety. The first wall portion 26 has largest thickness on the first horizontal portion 22, and the thickness decreases with distance from the first horizontal portion 22 due to the presence of the gradually changing portion 32. The first wall portion 26 has the smallest thickness at the end of the gradually changing portion 32.

A portion 34 to be cut off (third portion) is contiguous with the first wall portion 26 via a curved portion 36 (bent portion). The portion 34 extends in the direction away from the first horizontal portion 22. The cut line CL1 is drawn in the first wall portion 26 below the curved portion 36.

As shown in FIG. 4, in the portion to be formed into the second notch 30b, a thickened portion 38 is contiguous with one end of the first wall portion 26, which is opposite to the other end near the first horizontal portion 22. The thickened portion 38 has a thickness larger than those of the first wall portion 26 and the portion 34. The deepest portion of the second notch 30b is formed in the position of the cut line CL2 shown in FIG. 4. The first notch 30a, the third notch 30c, and the fourth notch 30d are formed in the same manner.

The second horizontal portion 24 and the second wall portion 28 have substantially the same shapes as the structures shown in FIG. 4. Therefore, illustration diagrams and detailed explanations thereof are omitted.

The press forming die apparatus 50 for producing the cover member 10 will be described below. As shown in FIG. 1, the press forming die apparatus 50 has a female die 52 as a first shaping die, and further has a male die 54 as a second shaping die. The female die 52 is a stationary die fixed in a predetermined position. The male die 54 is a movable die, which can be moved closer to and away from the female die 52 by an elevating mechanism (not shown). The press forming die apparatus 50 further has a heating unit 57 (heating units 57a, 57b such as heaters), and thereby acts to press-form the resin Re while heating the resin Re at a temperature of the melting point or higher, or in a range from a temperature of the glass-transition temperature to a temperature lower than the melting point.

A cavity 56 having a shape corresponding to the formed article is formed by the female die 52 and the male die 54. The cavity 56 is not a closed space but an opened space, the ends of the cavity 56 being opened. The heating units such as the heating units 57a, 57b are disposed inside the female die 52 and the male die 54 respectively. The heating units 57a, 57b are controlled by a control means (not shown), whereby the die temperature is maintained within a predetermined temperature range to be hereinafter described. FIG. 1 is a schematic view for illustrating a process flow for using the press forming die apparatus 50 to press-form a dried fiber-reinforced resin material P under heating. In FIG. 1, solid lines indicate the open state of the press forming die apparatus 50, and imaginary lines indicate the closed state thereof.

Figure 5:
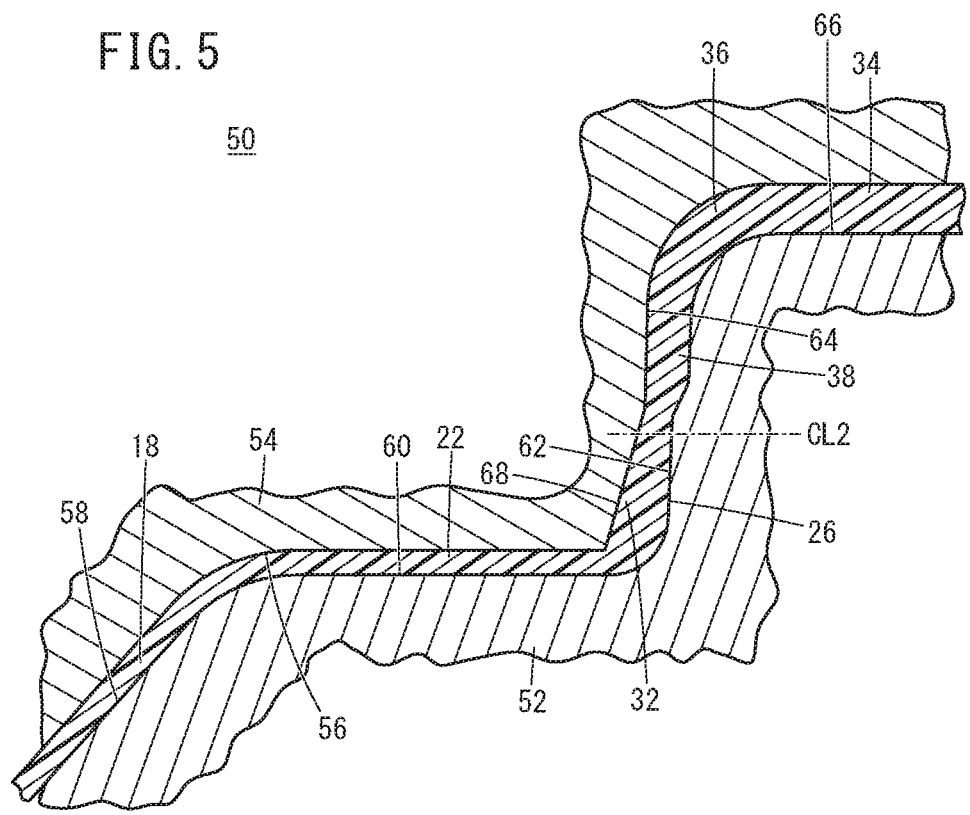
FIG. 5 is a vertical cross-sectional view of a principal part of a portion in the die apparatus for forming the part shown in FIG. 4 to produce the intermediate product.

FIG. 5 shows a part of the press forming die apparatus 50 which is used for forming the portion shown in FIG. 4. The cavity 56 contains a first inclined portion-forming region 58, a first horizontal portion-forming region 60, a peripheral wall-forming region 62, a thickened portion-forming region 64, and a cut portion-forming region 66, which are used for forming the first inclined portion 18, the first horizontal portion 22, the first wall portion 26, the thickened portion 38, and the portion 34 to be cut off, respectively. The male die 54 has a gradually changing portion-forming region 68 for forming the gradually changing portion 32. The design surface 12 of the outer surface is formed by the female die 52, and the back surface 14 is formed by the male die 54.

Figure 6:
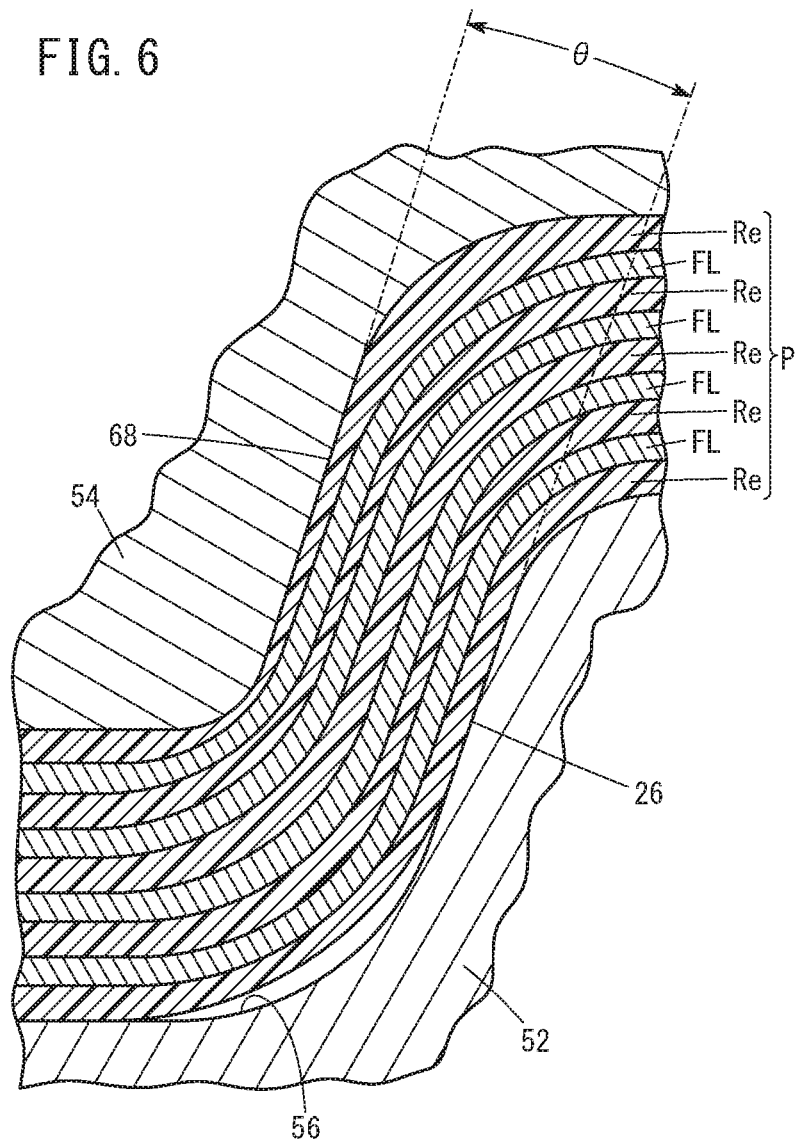
FIG. 6 is a vertical cross-sectional view of a principal part of the die apparatus.

FIG. 6 is a view for illustrating an intermediate state of the press forming die apparatus 50 changing from the open state to the closed state. The female die 52 and the male die 54 are heated in advance by the heating units 57a, 57b controlled by the control means. Specifically, the polycarbonate has a melting point of approximately 250° C., the female die 52 is heated at a temperature equal to or higher than the melting point of the resin Re, and the male die 54 is heated and maintained in a range from a temperature of the glass-transition temperature of the resin Re to a temperature less than the melting point thereof.

The peripheral wall-forming region 62 is arranged substantially perpendicularly to the first horizontal portion-forming region 60. In the press forming die apparatus 50 of this embodiment, as shown in FIG. 5, the male die 54 has a gradually changing portion-forming region 68 for forming the gradually changing portion 32 on the back surface 14 of the first wall portion 26. Thus, the width of the peripheral wall-forming region 62 in the thickness direction is gradually reduced in the vicinity of the thickened portion-forming region 64. In the narrowed end of the peripheral wall-forming region 62, the flow resistance of the molten or softened resin is increased, so that the impregnation of the cloth fiber layers FL with the resin Re is promoted.

Before the press forming die apparatus 50 is closed, the female die 52 is heated at a temperature equal to or higher than the melting point of the resin Re, and the male die 54 is heated and maintained at a temperature range from a temperature of the glass-transition temperature of the resin Re to a temperature lower than the melting point of the resin Re. Therefore, when the resin Re is brought into contact with the male die 54, the resin Re is not melted but only softened. Consequently, the resin Re is prevented from melting and adhering to the male die 54.

The male die 54 slides on a surface of the resin. The fiber is prevented from being ruptured due to the sliding. Furthermore, the surface of the resin is smoothened by the sliding. Therefore, even in a case where the deep drawing is performed to prepare a high wall as the first wall portion 26 on the first horizontal portion 22, the resultant first wall portion 26 can be obtained with excellent design. In addition, when the male die 54 slides on the surface of the resin, the resin is pressed against the female die 52 having a higher temperature, and is brought into contact with the female die 52. As a result, the resin is melted and the fiber layers are impregnated with the resin. Consequently, a composite material with excellent strength can be generated.

The resin is softened and melted in the above described manner. Therefore, the fiber layers FL of the woven cloths are impregnated with the resin Re, and is formed into a shape corresponding to the cavity 56, to prepare the intermediate product of the resin formed article. Then, the press forming die apparatus 50 is opened (see FIG. 1), and the intermediate product is divided into an upper section and a lower section by trim fixing. Then cutting with reference to the cut lines CL1, CL2, the cover member 10 shown in FIG. 2 is obtained as a final product.

As described above, in this cover member 10, resin loss and fiber rupture are prevented in the first wall portion 26. Therefore, the cover member 10 has an excellent appearance, and exhibits satisfactory strength as a composite material. Furthermore, since the gradually changing portion 32 is formed on the back surface 14 at the back side of the design surface 12, the flexibility in the appearance design of the design surface 12 is not deteriorated.

In addition, the fiber pieces can be freely moved in the thickened portion-forming region 64. Therefore, even in a case where the first wall portion 26 has a smaller height, the excellent appearance can be achieved. Furthermore, since the resin formed article has a smaller thickness in the vicinity of the peripheral wall (the first wall portion 26 and the second wall portion 28), the first notch 30a to the fourth notch 30d can be easily formed in the cutting process.

Figure 7:
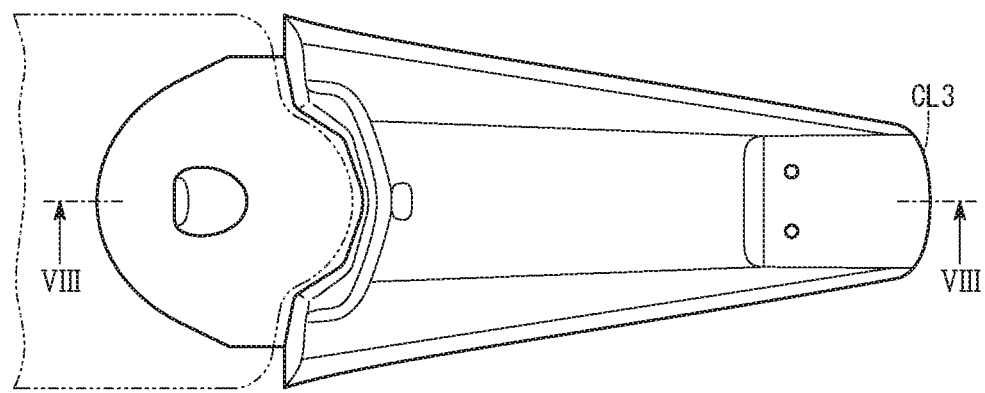
FIG. 7 is an overall schematic top view of a motorcycle rear fender of a resin formed article.
Figure 8:
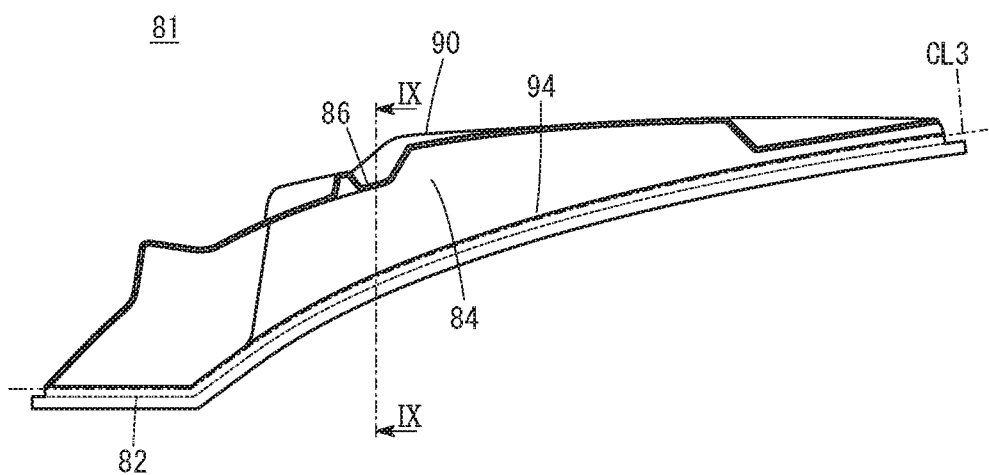
FIG. 8 is a cross-sectional view taken along the line VIII-VIII in FIG. 7.
Figure 9:
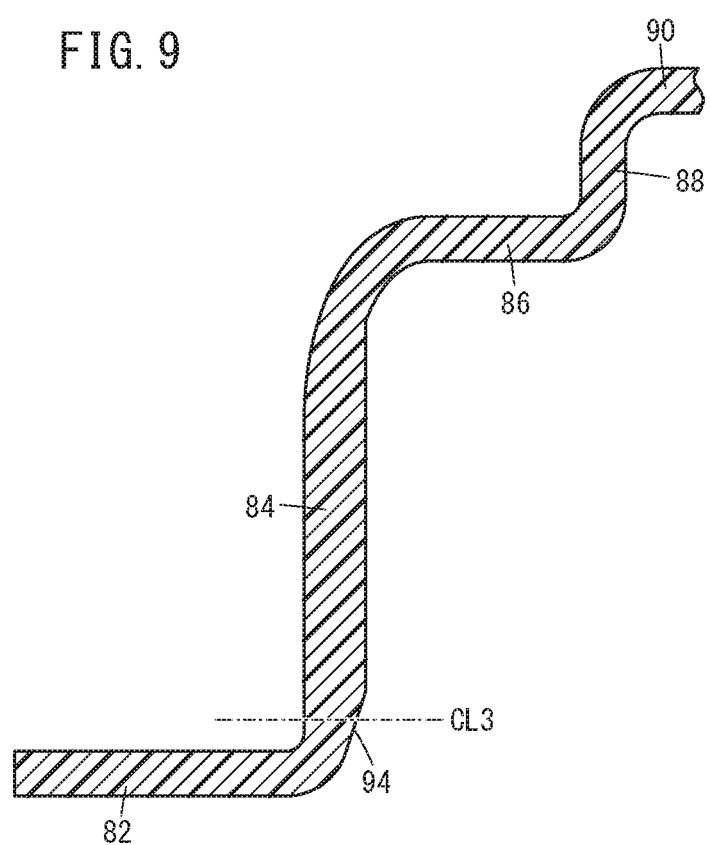
FIG. 9 is a sectional view showing an intermediate product for producing the motorcycle rear fender shown in FIGS. 7 and 8, which corresponds to a cross section taken along the line IX-IX in FIG. 8.
Figure 10:
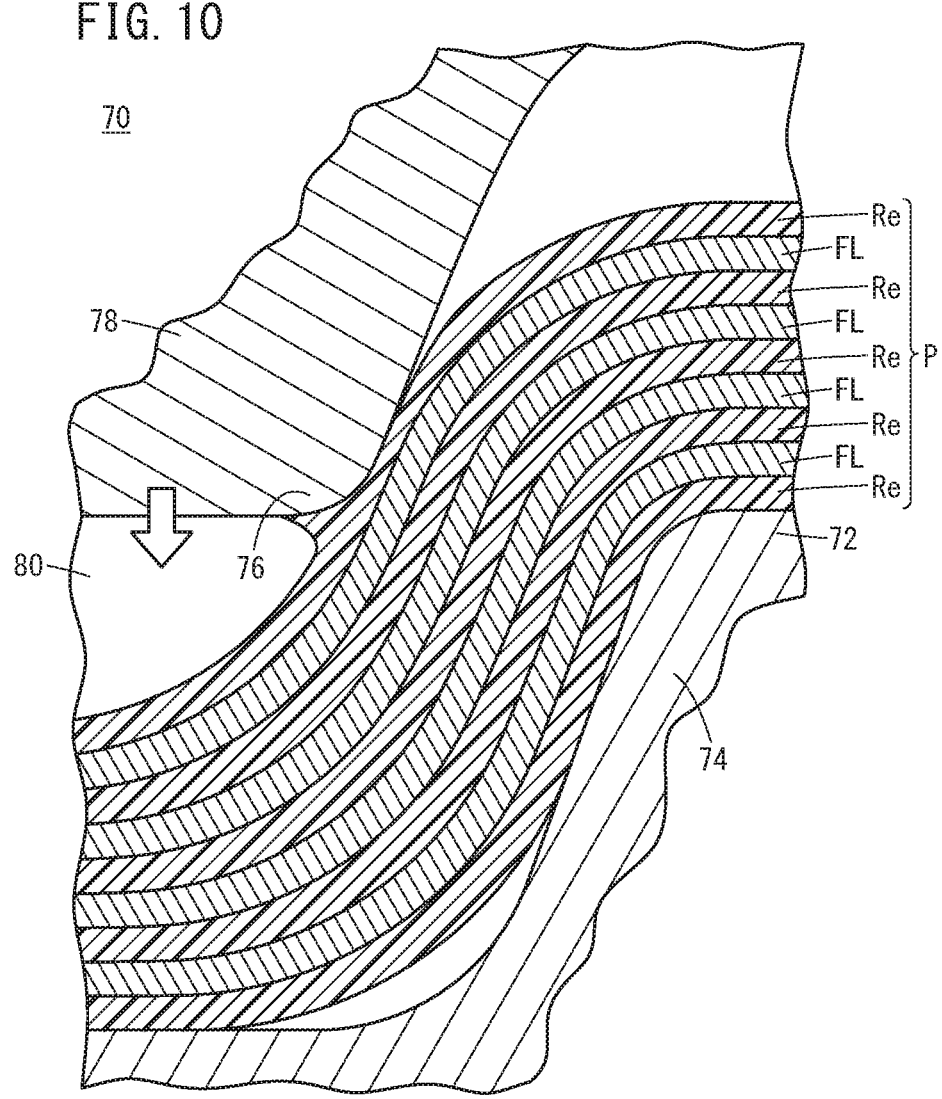
FIG. 10 is a vertical cross-sectional view of a principal part of a conventional die apparatus in a process of press-forming a deep-drawn portion.
Figure 11:
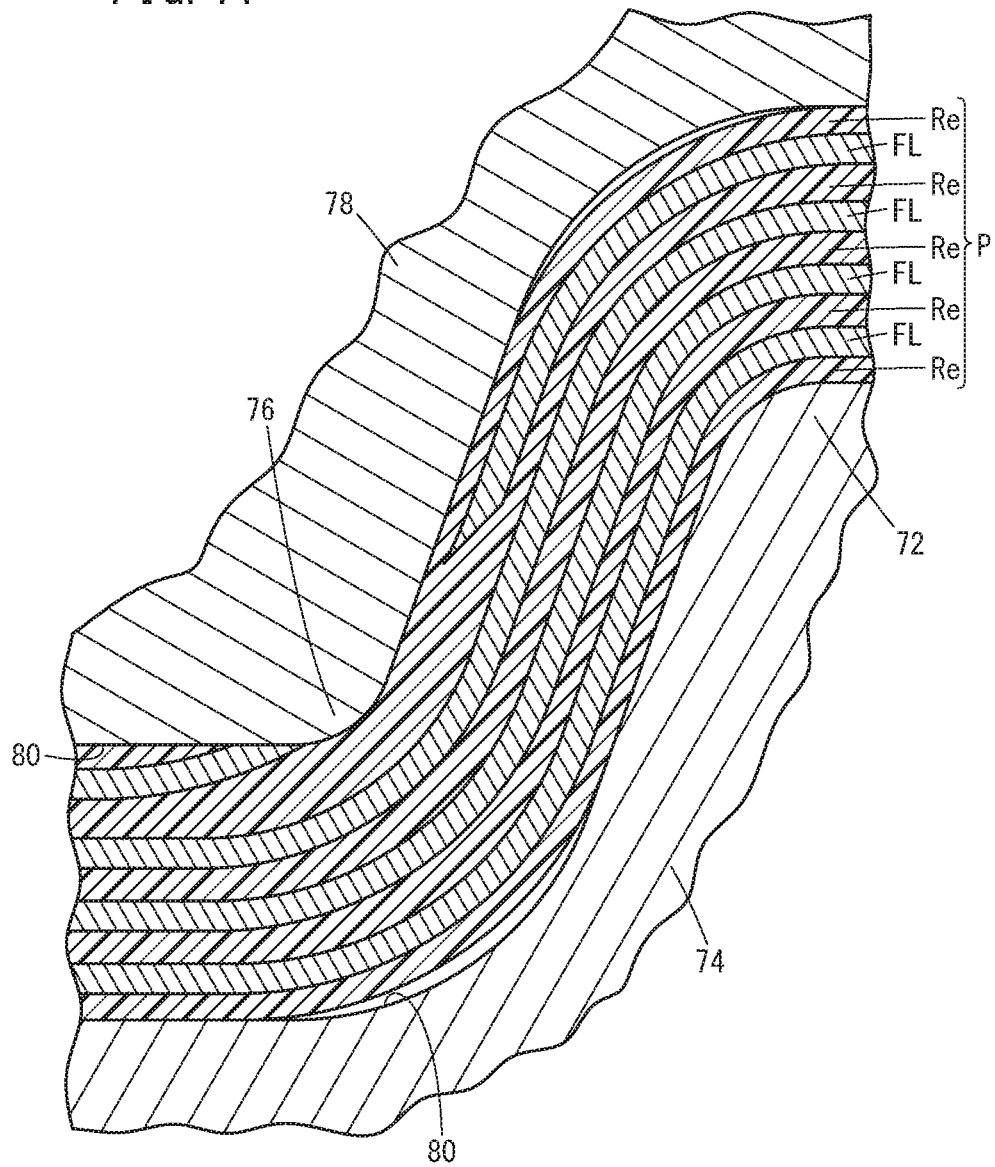
FIG. 11 is a vertical cross-sectional view of a principal part of the conventional die apparatus in a process of further lowering a second shaping die from the state shown in FIG. 10, resulting in rupture of a fiber layer and resin elution.

FIG. 7 is an overall schematic top view of a rear fender 81 for a motorcycle (hereinafter referred to as the rear fender 81), which is a final product according to another embodiment. FIG. 8 is a cross-sectional view of the rear fender 81 taken along the line VIII-VIII shown in FIG. 7 in the direction of the arrows. FIG. 9 is a sectional view of an intermediate product (a resin formed article) obtained before the cutting process, which corresponds to a cross section taken along the line IX-IX shown in FIG. 8. The intermediate product for the rear fender 81 has a portion 82 to be cut off, a first vertical wall portion 84 (a second portion) having a larger thickness, a first horizontal wall portion 86 (a first portion) bending from the first vertical wall portion 84 in the horizontal direction substantially perpendicularly to the first vertical wall portion 84, a second vertical wall portion 88 bending from the first horizontal wall portion 86 in the vertical direction substantially perpendicularly to the first horizontal wall portion 86, and a second horizontal wall portion 90 bending from the second vertical wall portion 88 in the horizontal direction substantially perpendicularly to the second vertical wall portion 88.

In this case, a bent portion is formed between the portion 82 to be cut off and the first vertical wall portion 84, and the cut line CL3 is drawn in the first vertical wall portion 84 compared with the bent portion. Furthermore, a gradually changing portion 94 is formed at an end of the first vertical wall portion 84 in the vicinity of the portion 82 to be cut off. The gradually changing portion 94 is a short part in the first vertical wall portion 84.

The gradually changing portion 94 has a lower end in the vicinity of the lower end of the first vertical wall portion 84 and a higher end facing toward the first horizontal wall portion 86. Thus, the first vertical wall portion 84 has the largest thickness at the end facing toward the first horizontal wall portion 86, and the thickness decreases in the vicinity of the cut line CL3 with distance from the first horizontal wall portion 86 due to the presence of the gradually changing portion 94. The first vertical wall portion 84 has the smallest thickness at the lower end of the gradually changing portion 94.

The rear fender 81 has the same advantageous effects as the cover member 10.

Although the fiber layer is the woven cloth of the carbon fiber in the above embodiment, the fiber layer is not limited to the woven cloth. The reinforcing fiber may be in the form of long fiber pieces or short fiber pieces in the fiber-reinforced thermoplastic resin material. A material of the resin layer is not limited to the polycarbonate, and may be another thermoplastic resin.

The present invention is not particularly limited to the embodiments described above, and various modifications are possible without departing from the essence and gist of the present invention.

What is claimed is:

1. A formed article of a fiber-reinforced resin material comprising a plurality of stacked fiber layers and a resin, the stacked fiber layers being impregnated with the resin, the formed article comprising a first portion and a second portion formed to have a deep-drawn shape with respect to the first portion, wherein the first portion is flat and contiguous with the second portion;

wherein the second portion includes a gradually changing portion that extends from a bend in the formed article between the first portion and the second portion, the gradually changing portion extending to a thickened portion of the second portion, the gradually changing portion having a thickness that gradually decreases with distance from the first portion, wherein the thickness of the gradually changing portion is defined by opposing side walls of the gradually changing portion, a first side wall of the opposing side walls being slanted with respect to a second side wall of the opposing side walls, wherein the thickened portion is thicker than a thinnest portion in the gradually changing portion of the second portion, and wherein the gradually changing portion and the thickened portion are distinct sections of the second portion.

2. The formed article according to claim 1, wherein the gradually changing portion is located on a back surface of a design surface of the formed article.

3. The formed article according to claim 1, wherein the formed article further comprises a third portion bending from the second portion in a direction away from the first portion, and the second portion is thicker than the first portion.

4. A method for producing a formed article of a fiber-reinforced resin material, the method comprising a step of forming the article in a cavity formed between a first shaping die and a second shaping die of a die apparatus, the fiber-reinforced resin material containing a plurality of stacked fiber layers and a resin, the stacked fiber layers being impregnated with the resin, the formed article containing a bend between a first portion and a second portion, the first portion being flat and contiguous with the second portion, wherein the first shaping die or the second shaping die includes a gradually changing portion-forming region configured to form a gradually changing portion on at least part of a design surface or a back surface of the second portion, the gradually changing portion having a thickness that gradually decreases with distance from the first portion, wherein the thickness of the gradually changing portion is defined by opposing side walls of the gradually changing portion, a first side wall of the opposing side walls being slanted with respect to a second side wall of the opposing side walls, wherein the second portion contains a thickened portion, the gradually changing portion extends from the bend to the thickened portion, and the thickened portion is thicker than a thinnest portion in the gradually changing portion of the second portion, and wherein the gradually changing portion and the thickened portion are distinct sections of the second portion.

5. The method according to claim 4, wherein in the forming step, one of the first shaping die and the second shaping die configured to form the gradually changing portion is configured to have a temperature equal to or higher than a glass-transition temperature of the resin and lower than a melting point of the resin, and another of the first shaping die and the second shaping die is configured to have a temperature equal to or higher than the melting point of the resin.

6. A die apparatus for producing a formed article of a fiber-reinforced resin material, the apparatus comprising a first shaping die and a second shaping die, the fiber-reinforced resin material containing a plurality of stacked fiber layers and a resin, the stacked fiber layers being impregnated with the resin, the formed article containing a first portion and a second portion formed to have a deep-drawn shape with respect to the first portion, the formed article being press-formed in a cavity formed between the first shaping die and the second shaping die, wherein the formed article has a bend between a first portion and a second portion, the first portion being flat and contiguous with the second portion, wherein the first shaping die or the second shaping die includes a gradually changing portion-forming region configured to form a gradually changing portion on at least part of a design surface or a back surface of the second portion, the gradually changing portion having a thickness that gradually decreases with distance from the first portion, wherein the thickness of the gradually changing portion is defined by opposing side walls of the gradually changing portion, a first side wall of the opposing side walls being slanted with respect to a second side wall of the opposing side walls, wherein the second portion contains a thickened portion, the gradually changing portion extends from the bend to the thickened portion, and the thickened portion is thicker than a thinnest portion in the gradually changing portion of the second portion, and wherein the gradually changing portion and the thickened portion are distinct sections of the second portion.

7. The die apparatus according to claim 6, wherein the first shaping die and the second shaping die include a heating unit configured to heat the dies, and one of the first shaping die and the second shaping die including the gradually changing portion-forming region configured to form the gradually changing portion of the formed article is configured to be heated by the heating unit at a temperature equal to or higher than a glass-transition temperature of the resin and lower than a melting point of the resin.

\* \* \* \* \*